United States Patent
Darak et al.

(10) Patent No.: US 10,963,568 B1
(45) Date of Patent: Mar. 30, 2021

(54) USING SECURITY APP INJECTION AND MULTI-DEVICE LICENSING TO RECOVER DEVICE FACING DENIAL OF ACCESS CAUSED BY MALWARE INFECTION

(71) Applicant: Symantec Corporation, Mountain View, CA (US)

(72) Inventors: Anand Darak, Rahuri (IN); Anuradha Joshi, Pune (IN); Pallavi Rajput, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 398 days.

(21) Appl. No.: 15/993,400

(22) Filed: May 30, 2018

(51) Int. Cl.
*G06F 21/56* (2013.01)
*G06F 8/61* (2018.01)

(52) U.S. Cl.
CPC .......... *G06F 21/566* (2013.01); *G06F 8/61* (2013.01); *G06F 8/62* (2013.01); *G06F 2221/034* (2013.01)

(58) Field of Classification Search
CPC ..... H04L 63/145; G06F 21/566; G06F 21/56; G06F 21/554; G06F 21/55; G06F 21/00; G06F 21/561; H04W 12/1208
See application file for complete search history.

(56) References Cited

U.S. PATENT DOCUMENTS

| 2011/0161452 A1* | 6/2011 | Poornachandran | H04W 12/1208 709/207 |
| 2014/0040622 A1* | 2/2014 | Kendall | H04W 12/0401 713/171 |
| 2017/0206351 A1* | 7/2017 | Jay | H04W 12/0802 |

* cited by examiner

*Primary Examiner* — Matthew Smithers
*Assistant Examiner* — Mirza Israr Javed
(74) *Attorney, Agent, or Firm* — Brill Law Office; Jeffrey Brill

(57) ABSTRACT

A mobile computing device is infected by malware which blocks access to the infected device by an authorized user. A download and installation request is generated from another device and sent to a third-party service via the internet to allow a first instance of a mobile device security application to be downloaded and installed on the infected device. A second instance of the same mobile device security application is also downloaded and installed on a clean device, with the first and second instances of the mobile device security application being covered under a single license. An instruction is generated on the mobile device security application on the clean device and transmitted to the infected device. Based on the received instruction, the mobile device security app is initiated and at least one access setting is modified on the infected device to enable user access.

21 Claims, 5 Drawing Sheets

USING SECURITY APP INJECTION AND MULTI-DEVICE LICENSING TO RECOVER DEVICE FACING DENIAL OF ACCESS CAUSED BY MALWARE INFECTION

TECHNICAL FIELD

This disclosure pertains generally to computing device security, and more specifically to recovering a device facing denial of access caused by malware infection.

BACKGROUND

Mobile device users and businesses face a growing threat to security and privacy on the internet, from computer viruses and other forms of malware. Ransomware, a malware species, may operate by gaining control of a device and denying authorized users access to their data. The ransomware then demands payment of a ransom (typically using cryptocurrency) in order to regain access to the data.

Some ransomware also resets passcodes or other authentication information for the infected computing devices, which make the computing devices inaccessible even in a safe mode. Conventionally, if no anti-malware solution was installed on such a computing device before the infection, the only recovery mechanism that remains is the factory reset.

It would be desirable to address these issues.

SUMMARY

A mobile computing device infected by malware which is preventing user access may be recovered using security app injection and multi-device licensing. More specifically, a request may be transmitted via the internet to direct the malware-infected mobile computing device to download and install a mobile device security app from a third-party service, such as an app store.

In certain circumstances, the request for downloading and installing the mobile device security app on the malware-infected mobile computing device may be generated online on an app store-related website from another computing device. A user account associated with the malware-infected mobile computing device may be used in the selection of the malware-infected mobile computing device for app download and installation.

To initiate the mobile device security app installed on the malware-infected mobile computing device, a signal may then be transmitted from a clean mobile computing device to the malware-infected mobile computing device, to direct the malware-infected mobile computing device to run certain functions of the installed mobile device security app for device recovery.

Responsive to receiving the signal transmitted from the clean mobile computing device, the malware-infected computing device may automatically run the mobile device security app based on the instruction(s) included in the signal transmitted from the clean mobile computing device. For example, the mobile device security app may scan the malware-infected mobile computing device, detect malware, clean and/or quarantine the detected malware, change access settings or other authentication information of the malware-infected mobile computing device, etc. By execution of one or more of these functions provided by the mobile device security app, the malware-infected mobile computing device may allow a user to regain access and thus recover the malware-infected mobile computing device.

In certain circumstances, the signal received from the clean mobile computing device by the malware-infected mobile computing device may be transmitted via a non-handshake communication protocol, such as near field communication (NFC). The clean mobile computing device may be set as a passive device so that the signal including the instruction(s) may be read by the malware-infected mobile computing device when the two devices are placed within a range of each other.

In certain circumstances, to prepare the instruction(s) included in the signal for transmission from the clean mobile computing device to the malware-infected mobile computing device, the clean mobile computing device may also download and install the same mobile device security app on the clean mobile computing device, either directly on the clean mobile computing device via an app store, or via a similar approach aforementioned for the installation of the app on the malware-infected mobile computing device.

In certain circumstances, to allow the installed mobile device security app to be able to run on the malware-infected mobile computing device, the instance of the mobile device security app installed on the clean device and the instance of the mobile device security app on the malware-infected mobile computing devices may be under the same license. One way to achieve this is to install the mobile device security app on the two devices using the same user account. The instance of the mobile device security app on the clean device can then provide the associated credentials to the instance of the mobile device security app on the malware-infected mobile computing device so that it can authenticate itself and operate.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Mobile computing devices sometimes get hijacked by various type of malware (e.g., ransomware), which may perform a wide variety of actions, such as recording audio, taking photos, monitoring communications, tracking GPS locations, stealing credentials, etc. Under certain circumstances, some malware resets the device access credentials (e.g., the mobile device access code, password, biometric authentication, etc.), which makes the infected device inaccessible even in a safe mode, without performing a factory reset. A mobile device security app is described herein which can be installed on an infected mobile computing device after the fact, and regain access.

Figure 1:
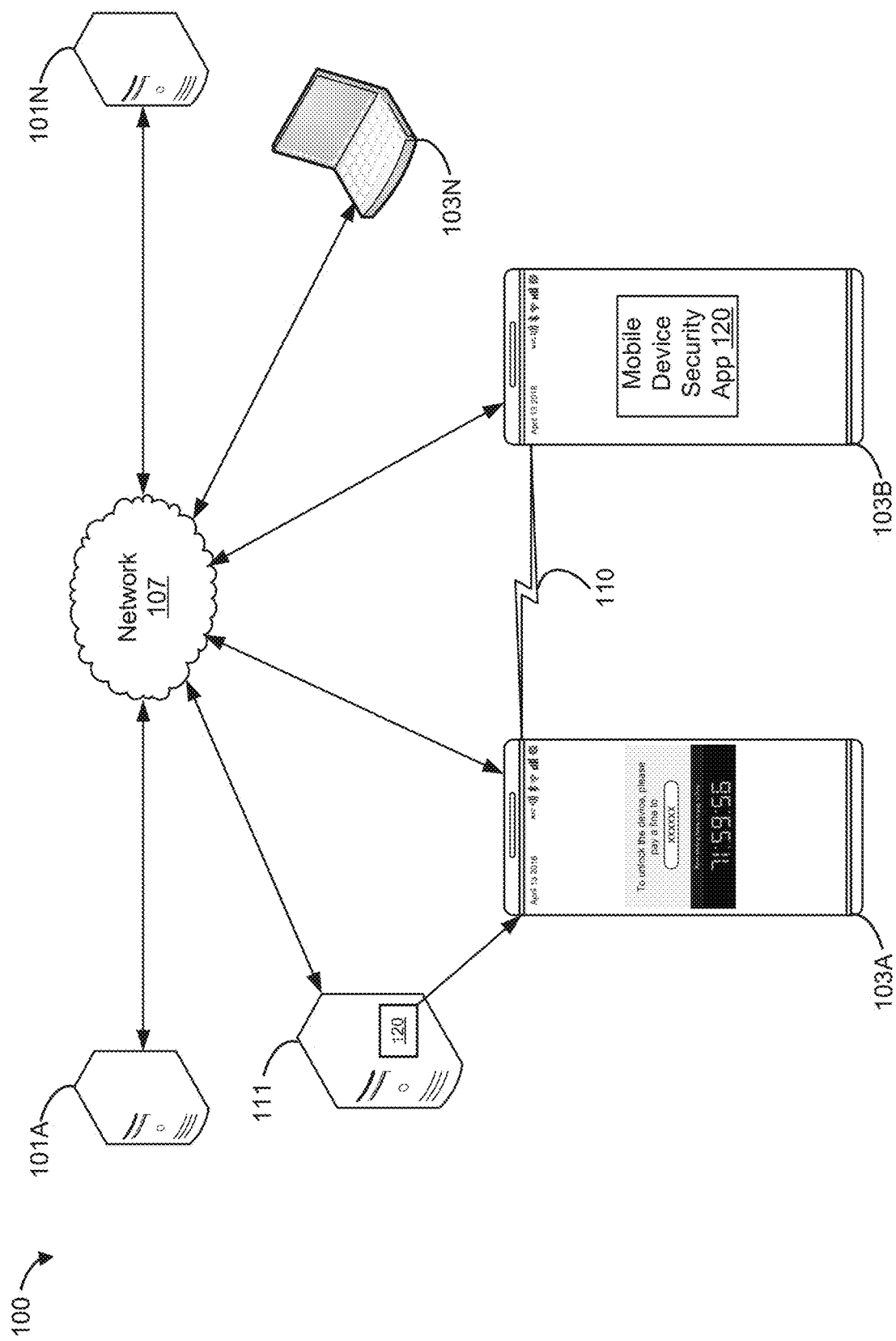
FIG. 1 illustrates a network architecture 100 in which a mobile device security app 120 can operate and regain access to a malware-infected mobile computing device, according to some embodiments.

FIG. 1 illustrates a network architecture 100 in which a mobile device security app 120 can operate and regain access to a malware-infected mobile computing device 103A, according to some embodiments. Amongst other things, the schematic drawing 100 illustrates servers 101A and 101N, a third-party server 111, a malware-infected mobile computing device 103A (may be simply referred as an "infected device"), a non-malware-infected mobile computing device 103B (may be simply referred as a "clean device"), and a third client device 103N, all of which are communicatively coupled to a network 107.

Client device 103, including the clean device 103B, the infected device 103A, and the third client device 103N, can be in the form of, for example, mobile computing devices comprising portable computer systems capable of connecting to a network 107 and running applications, or desktop or rack-mounted computers. Some examples of mobile computing devices are smartphones, tablets, laptop computers, hybrids, convertible laptops, smart watches, smart bracelets, and other types of wearable computing devices. In some embodiments, at least one of the clean device 103B and the infected device 103A is a mobile computing device.

In some embodiments, a non-infected mobile computing device 103B may include an installed mobile device security app 120, as illustrated in FIG. 1. The mobile device security app 120 may protect a clean device from infection by malware and even recover an infected device under certain circumstances. The mobile device security app 120 may be installed on the non-infected mobile computing device 103B from a third-party server 111 (e.g. Google Play®, Apple App Store®, Microsoft Store®, etc.) with or without a user manipulating the device 103A, as explained in greater detail below in conjunction with FIGS. 3-5.

In the scenario described herein, a malware-infected mobile computing device 103A did not have the mobile device security app 120 installed at the time it becomes infected by the malware, as illustrated in FIG. 1. It is not uncommon for users to neglect to install a mobile device security app 120 on their mobile computing devices 103, which can leave them vulnerable to such attacks. Under certain circumstance, the infected device 103A may even be locked by the infecting malware, and thus not accessible for a user to manipulate the device. To recover such a device, the mobile device security app 120 may be installed on the device without a user having access to manipulate the infected device 103A. For instance, a user may access to a third-party server 111 from a clean device 103B or a third client device 103N to instruct the mobile device security app 120 to be installed on the infected device 103A, as explained in greater detail below in conjunction with FIGS. 3-5.

Many different networking technologies can be used to provide connectivity from each of the client devices 103A-N to the network 107. Some examples include: LAN, WAN (e.g., the internet), a cellular network, and various other wireless technologies. Client devices 103A-N are able to access applications and/or data on server 101A or 101N, third-party server 111, or even another client device 103, using, for example, a mobile app, a web browser, or other client software (not shown). This enables client devices 103A-N to run and otherwise interact with applications from a server 101 and third-party server 111 and/or to access data hosted by a server 101, third-party server 111, client device 103, or other devices connected to the server 101 and third-party server 111 through wireless or wired connections. For instance, a clean device 103B may access a third-party server 111 through the network 107 to install the mobile device security app 120 on the clean device 103B, and a client device 103N may access a third-party server 111 through the network 107 to install the mobile device security app 120 on the infected device 103A.

In some embodiments, the mobile client devices 103A-N may directly communicate with each other without relying on a network 107 for setting up the communication. For instance, a clean device 103B may directly exchange data with an infected device 103A via a non-handshake wireless communication approach 110, as illustrated in FIG. 1. This direct communication and data exchange between the client devices 103 may provide an approach to allow one client device to manipulate another device without requiring a user to directly access the other device. For instance, through direct communication, an instance of the mobile device security app installed on the clean device 103B may send a string of commands to the instance of the mobile device security app 120 installed on the infected device 103A after the time of infection, to allow the mobile device security app 120 to reset the authentication credentials on the infected device 103A (e.g., to enable user access to the infected device), before the user is able to access the infected device to take actions automatically.

The server 101A-N and the third-party server 111 may include one or more computing components having data processing, storing, and communication capacities. For example, a server 101 and third-party server 111 may include one or more hardware servers, virtual servers, server arrays, storage devices and/or systems, etc. In some embodiments, a third-party server 111 may provide software applications (e.g., mobile apps) for downloading by mobile computing devices 103A, 103B, and other client devices 103.

Although FIG. 1 illustrates three client devices 103A-N, two servers 101A-N, and one third-party server 111 as an example, in practice many more (or fewer) computing devices can be deployed. In some example embodiments, the network 107 is in the form of a wireless LAN, a cellular network, the internet, or a combination of these. Other networks 107 or network-based environments can be used in other embodiments.

Figure 2:
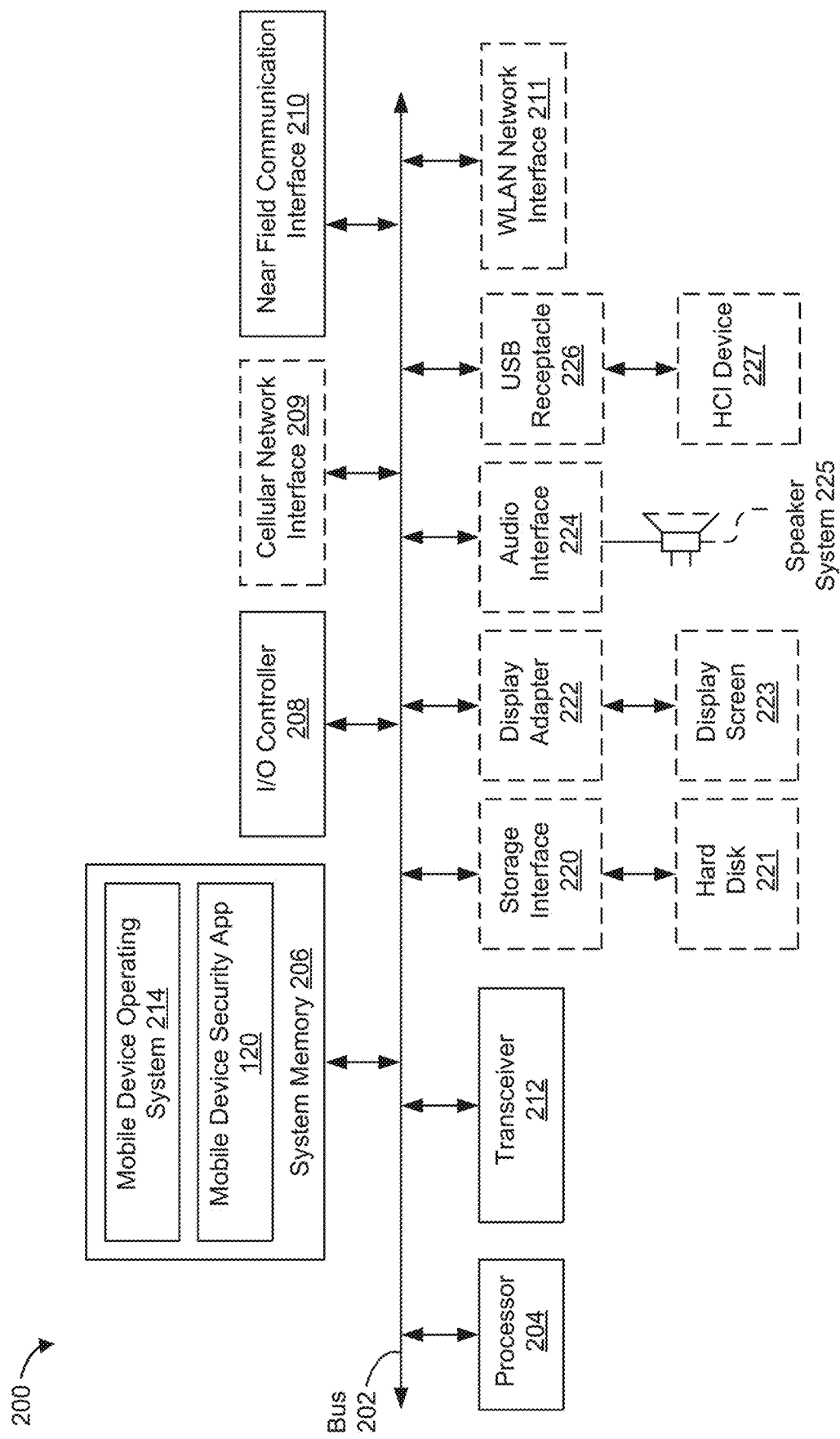
FIG. 2 is a block diagram of a computer system suitable for implementing a mobile device security app, according to some embodiments.

FIG. 2 is a block diagram of a computer system 200 suitable for implementing a mobile device security app 120, according to some embodiments. For example, the computer system 200 may be a mobile computing device such as a smartphone, a tablet, or other form(s) of mobile device.

As illustrated, one component of the computer system 200 is a bus 202. The bus 202 communicatively couples other components of the computer system 200, such as at least one processor 204, system memory 206 (e.g., random access memory (RAM), read-only memory (ROM), flash memory), an input/output (I/O) controller 208, a cellular (or other type of mobile telephony) network interface 209, a near field communication interface 210, a WLAN network interface 211, and a transceiver 212.

The cellular network interface 209 and the WLAN network interface 211 may include a variety of protocols to connect to mobile telephony networks, local WiFi networks and/or the internet. In general, the cellular network interface 209 may use a cellular network standard such as the LTE interface or the universal mobile telecommunications system (UTMS) interface, whereas the WLAN network interface may comport with an Institute of Electrical and Electronics Engineers' (IEEE) 802.11 wireless local area network (WLAN) or wireless Ethernet interface. In some embodiments, the computer system 200 may have multiple network interfaces that provide connectivity to several types of networks concurrently or non-concurrently, such as that depicted in the computer system 200.

The NFC interface 210 may include a variety of communication protocols that enable two electronic devices, at least one of which is usually a mobile computing device, to establish communication by bringing them within a certain distance (e.g., 4 cm) of each other. In general, NFC standards cover communications protocols and data exchange formats and are based on existing radio-frequency identification (RFID) standards including ISO/IEC 14443 and FeliCa. The standards include ISO/IEC 18092 and those defined by the NFC Forum. In addition to the NFC Forum, the GSMA group defined a platform for the deployment of GSMA NFC Standards within mobile handsets. GSMA's efforts include Trusted Services Manager, Single Wire Protocol, testing/certification and secure element(s). In some embodiments, an NFC-enabled device can be provided with application software to read electronic "tags" that include customized data.

The bus 202 may also be communicatively coupled to other optional components such as a storage interface 220 communicatively coupled to one or more hard disk(s) 221 (or other form(s) of storage media), a display adapter 222 communicatively coupled to a video output device such as a display screen 223, an audio output interface 224 communicatively coupled to an audio output device such as a speaker 225, and one or more interfaces such as a universal serial bus (USB) receptacle 226 communicatively coupled to various peripherals such as human-computer interaction (HCI) devices 227 (e.g. keyboard, mice, sensors, etc.).

The bus 202 allows data communication between the processor 204 and system memory 206, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 221, flash memory, ROM, etc.) and loaded into system memory 206 and executed by the processor 204. Application programs can also be loaded into system memory 206 from a remote location (i.e., a remotely located third-party server 111), for example via the network interfaces.

In FIG. 2, a mobile device security app 120 is illustrated as residing in system memory 206. As described elsewhere herein, the mobile device security app 120 may or may reside in system memory 206 of a computing system 200. The workings of the mobile device security app 120, including how it is installed and/or manipulated to run on a computing system 200, are explained in greater detail below in conjunction with FIGS. 3-5.

A mobile operating system 214 is also illustrated as residing in system memory 206. The mobile operating system 214 may provide an interface between mobile apps and hardware of the computer system 200. For instance, the mobile operating system 214 may include drivers to control and receive data from the network/communication interfaces 209, 210, and 211, transceiver 212, etc. Further, the mobile operating system 214 may include an application programming interface (API) to provide application programs, such as the mobile device security app 120, access to operating system services. The mobile operating system 214 may also provide a common operating environment for mobile apps. Some non-exhaustive examples of mobile operating systems are Android®, iOS®, and Windows 10 Mobile®.

The storage interface 220 is coupled to one or more hard disks 221 (and/or other standard storage media such as flash). The hard disk(s) 221 may be a part of computer system 200, or may be physically separate and accessed through other interface systems.

Figure 3:
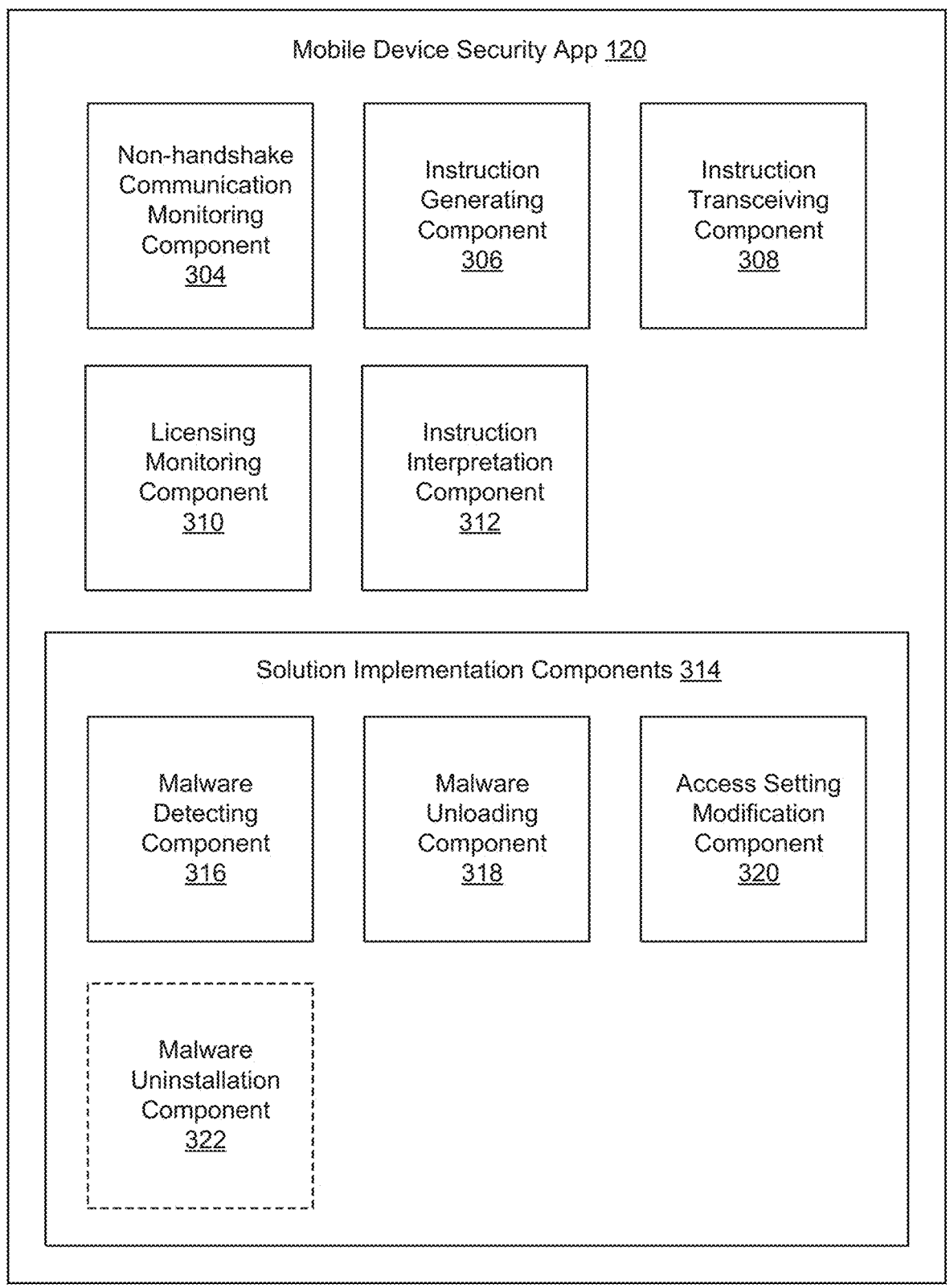
FIG. 3 is a block diagram of a mobile device security app, according to some embodiments.

FIG. 3 is a block diagram of a mobile device security app 120 according to some embodiments. The mobile device security app 120 includes a non-handshake communication monitoring component 304, an instruction generating component 306, an instruction transceiving component 308, a licensing monitoring component 310, an instruction interpretation component 312, and one or more solution execution components 314. The one or more solution execution components 314 may include a malware detecting component 316, a malware unloading component 318, an access setting modification component 320, and a malware uninstallation component 322.

The non-handshake communication monitoring component 304 can monitor non-handshake communication between a mobile computing device 103 and another communicating participant. As the name indicates, communication according to a non-handshake protocol enables direct communication between two entities without a necessary automated negotiation process at the beginning of the communication session. By contrast, traditional handshake protocol-based communication (such as WIFI WAN, etc.) requires such negotiation (known as handshaking) to establish a session.

One of the exemplary non-handshake communication protocols is Near Field Communication (NFC). NFC has evolved from an older wireless RFID, which functions as an electronic identifier and has many commercial uses. While RFID chips only transmit a signal in one direction, NFC chips can both receive and send signals. NFC can operate in three different modes: peer-to-peer, read/write, and card emulation. In the peer-to-peer mode, two NFC-enabled devices may share data back and forth. In the read/write mode, one active device can pick up information from a passive one. In the card emulation mode, an NFC-enabled device can be turned into a contactless card for contactless payment. In contrast to handshake protocol-based communication, NFC may initiate an exchange of information between two mobile computing devices without any user manipulation other than merely placing the two devices within a range of each other. This may be achieved, for example, through a read/write communication mode, in which one NFC-enabled mobile computing device (e.g., an infected device 103A) may be considered as an active device to pick up information from another NFC-enabled passive device (e.g., a clean device 103B).

In some embodiments, the non-handshake communication monitoring component 304 can monitor the operation of an NFC-enabled device by setting it as a passive device or active device. In some embodiments, the non-handshake communication monitoring component 304 may set a default passive or active mode for an NFC-enabled device, and change it to the other mode by modifying the setting through the installed mobile device security app 120. For instance, the non-handshake communication monitoring component 304 may set the default mode of an NFC-enabled infected device 103A as an active device, and set a clean device 103B as a passive device.

The instruction generating component 306 may generate one or more instructions for directing a mobile device security app 120 to execute certain actions on a mobile computing device 103. For instance, the instruction generating component 306 may generate an instruction to direct a mobile computing device 103 to scan for the presence of malware on the device, or clean detected malware. In some embodiments, the instruction generating component 306 may pre-generate frequently used instructions and store them within the mobile device security app 120, so that pre-generated instructions can be selected at a later time.

In some embodiments, the instructions generated by the instruction generating component 306 may also be executed on another mobile computing device. For instance, an instruction may be generated by the instruction generating component 306 to direct another mobile computing device 103 to execute certain actions, for example, to scan for malware, unload malware, change security profile, etc.

In some embodiments, an instruction generated by the instruction generating component 306 may comprise a string of one or more commands that can be transmitted to another mobile computing device 301, for example, through NFC or other non-handshake communication methods.

In some embodiments, two or more instructions (e.g., scanning malware, unloading malware, and changing security profile) may be generated by the instruction generating component 306 and be placed together in the same string of commands for transmission between two mobile computing devices. For instance, a series of instructions may be placed into a single string of commands to be transmitted to another device to instruct the other device to perform a series of actions in an order, such as 1) scan for malware, 2) unload malware, 3) change security profile, etc.

The instruction transceiving component 308 may transceive instructions generated on the mobile device security app 120. The instruction transceiving component 308 may cooperate with the transceiver 212 of a mobile computing device to transmit and/or receive the instructions generated on the mobile device security app 120. For instance, the instruction transceiving component 308 on a clean device 103B may mediate transmission of an instruction generated on the clean device 103B, while the instruction transceiving component 308 on an infected device 103A may mediate reception of the instruction on the infected device 103A.

The licensing monitoring component 310 may enforce and verify licensing information on the mobile device security app 120 installed on a mobile computing device 103. The licensing information for the mobile device security app 120 may include necessary credentials to allow the mobile device security app 120 to run on a mobile device. In some embodiments, the licensing information for the mobile device security app 120 may merely include a certain code that is provided by a provider of the app 120. In some embodiments, the licensing information for the app 120 may be linked with a user account (e.g., credentials for login to an account associated with the app provider, or with a third-party service provider, such as a Google® account, an Apple® ID, or a Microsoft® account, etc.). In some embodiments, the licensing information may additionally include a limitation of a number of devices that can be registered and covered under a license. For instance, the licensing information for the mobile device security app 120 may indicate that at most five devices may be registered with a user account for coverage under the same license.

In some embodiments, the licensing monitoring component 310 may cooperate with an app provider (e.g. Google Play®, Apple App Store®, Microsoft Store®, etc.) to enforce or verify licensing information. This may include querying an app provider to verify the licensing information provided for the mobile device security app 120, and applying or enforcing custom constraints on the app 120 (e.g., to allow or prohibit the app 120 to run on a mobile device) based on the provided licensing information.

In some embodiments, in order to provide the necessary licensing information to allow the infected device 103A to run the installed mobile device security app 120, the instruction generating component 306 on a clean device may include licensing information (e.g., user account credentials) for the mobile device security app 120 installed on the infected device when generating an instruction for the infected device 103A. When the instruction is transmitted to the infected device 103A, the included licensing information may be first extracted by the licensing monitoring component 310 for submission to the app provider for verification. This may improve the security of the infected mobile computing devices by only allowing an instruction from a licensed user to be executed.

The instruction interpretation component 312 may interpret instructions generated by the instruction generating component 306. The instruction interpretation component 312 may extract the instructions from the received string of commands to determine actions to be executed, and direct the mobile device security app 120 to initiate and/or execute certain actions based on the extracted instructions. For instance, based on the string of commands received from the clean device 103B, the instruction interpretation component 312 may determine certain actions to be executed on the mobile device security app 120 to recover an inaccessible infected device 103A.

The solution implementation components 314 include one or more components that assist recovery of an inaccessible infected device 103A. The one or more components may include a malware detecting component 316, a malware unloading component 318, an access setting modification component 320, and a malware uninstallation component 322.

The malware detecting component 316 may run a general malware scan to detect malware on the mobile computing device. Different scanning modes, for example, a quick scan, a full scan, or a custom scan, may be conducted. A quick scan may save time, but generally does not include scanning certain parts of a mobile computing device, including certain sensitive areas that can harbor the most dangerous malware. The full scan may scan every part of a mobile computing device 103, including a boot record, a boot sector, memory objects, registry objects, any application currently running in memory, etc. In some embodiments, the full scan may also scan a connected storage device (e.g., a Micro SD card). The custom scan may scan certain parts of a mobile computing device or its connected storage device designated by a user. By performing one of the above scanning modes, malware that has infected the mobile computing device 103 may be detected.

The malware unloading component 318 may quarantine and/or clean detected malware. In some embodiments, detected malware may be quarantined or immediately cleaned by the malware unloading component 318. The malware unloading component 318 may stop, unload, or remove any detected malware.

The access setting modification component 320 may modify the access settings of an infected device 103A. In some embodiments, infecting malware may have changed some or all of login credentials or other authentication profile information on an infected device 103A. The access setting modification component 320 may change or reset the login credentials and authentication profile information that has been changed by the malware. This may include reversing or resetting the access code that has been changed by the malware, changing the current access authentication mode into another access authentication mode (e.g., from an access code to a biometric scan) or directly enabling another access authentication mode (e.g., a biometric scan), or enabling the infected device to boot into a safe mode, etc.

The malware uninstallation component 322 may allow infecting malware to be automatically or manually uninstalled. In certain embodiments, the malware uninstallation component 322 may work together with the malware detecting component 316 to automatically uninstall malware when it is detected. In certain embodiments, the malware uninstallation component 322 may allow a user to manually uninstall the detected malware after a user regains access to the infected device 103A. By removing the infecting malware, the previously-infected mobile computing device 103 can then be recovered.

It should be noted that specific components described above for the mobile device security app 120 are provided merely for illustrational propose, and should not be constructed as limiting specific functions and components of the mobile device security app 120. The mobile device security app 120 may include additional or fewer or different of the above-described components.

Figure 4:
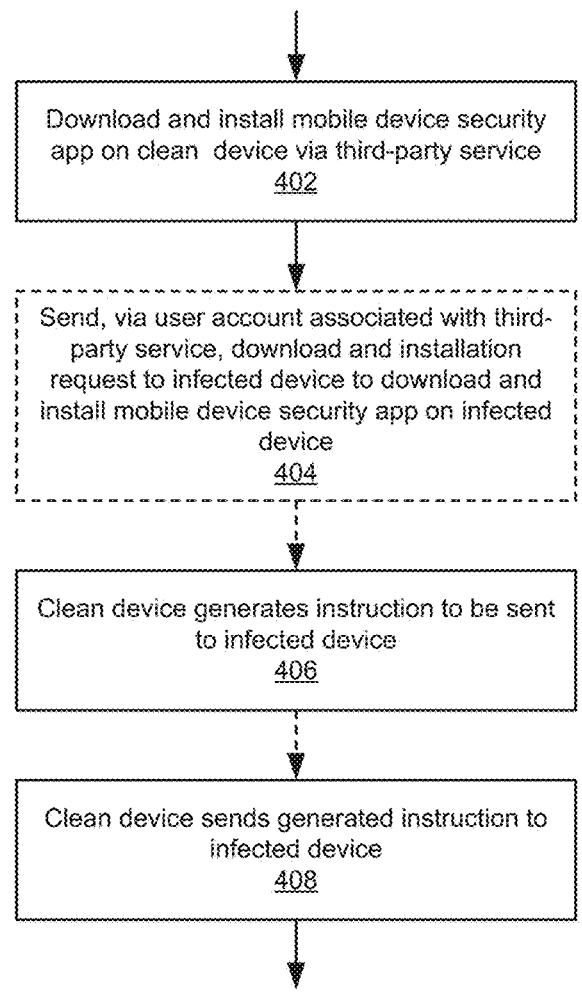
FIG. 4 is a flowchart of clean mobile computing device side steps for recovering a malware-infected mobile computing device, according to some embodiments.

FIG. 4 is of clean mobile computing device side steps for recovering a malware-infected mobile computing device, according to some embodiments.

At step 402, a clean device 103B downloads and installs a mobile device security app 120 through a third-party service (e.g., Google Play®, Apple App Store®, Microsoft Store®, etc.). The clean device 103B is associated with a user account (e.g., a Google® account for Google Play®, an Apple® ID for Apple App Store®, a Microsoft® account for Microsoft Store®, etc.) on the third-party service. The licensing information of the installed mobile device security app 120 is associated with the user account.

At step 404, the clean device 103B (or in some embodiments another client device 103N) sends a download and installation request to a third party server 111 to direct the mobile device security app 120 to be downloaded and installed on a designated infected device 103A. For instance, a user may login into the user account online to generate a download and installation request on the user account to request the mobile device security app 120 to be downloaded and installed on the designated malware-infected device 103A. The request is sent to a third-party server 111 through the internet. The third-party server 111 may automatically download and install the mobile device security app 120 on the infected device 103A when an internet connection is established between the third-party server 111 and the designated infected device 103A.

It should be noted that while the clean mobile computing device 103B is described here as the device that generates the download and installation request, the device that generates such request is not limited to the clean device 103B with the installed mobile device security app 120, but rather could be any other device with internet access from which the user can login to the third-party service. For instance, a user may access his or her user account through a laptop 103N to request the mobile device security app 120 to be downloaded and installed on the infected device 103A.

At step 406, the clean device 103B generates an instruction to be sent to the infected device 103A. The instruction, upon receipt by the infected device 103A, directs the infected device 103A to take certain actions, for example, to run the installed mobile device security app 120 to detect infecting malware, clean or quarantine the infecting malware, change the access code, change the access authentication mode, enable booting in safe mode, etc. The instruction generated by the clean device 103B may include licensing information that provides necessary credentials (e.g., user login, etc.) to allow the mobile device security app 120 to authenticate itself and perform certain actions on the infected device 103.

At step 408, the clean device 103B sends the generated instruction to the infected device 103A. The instruction is transmitted via non-handshake communication, for example, NFC. The clean device 103B can be set as a passive device, so that when it is placed within a range of the infected device 103A, the instruction can be read by the infected device 103A, thereby completing the transmission of the instruction without requiring any user input on the infected device 103A.

Figure 5:
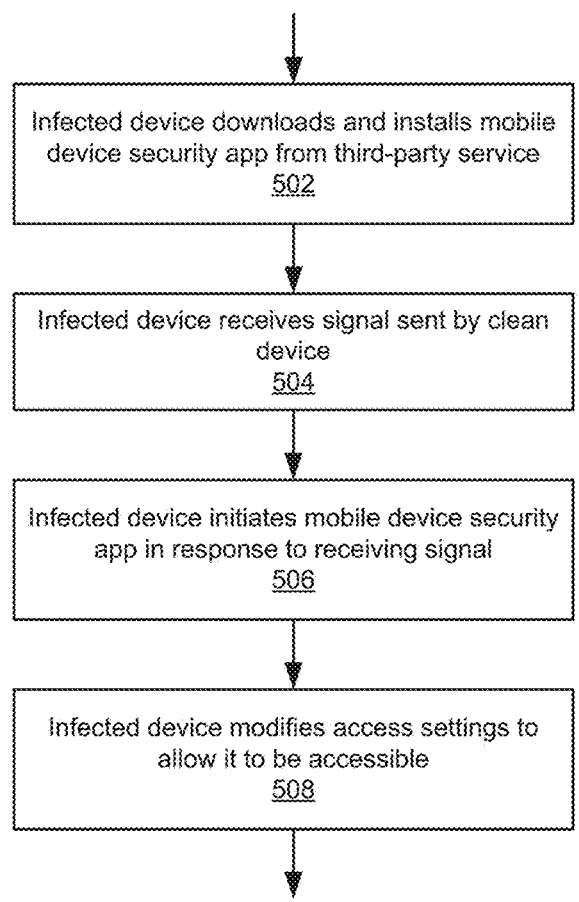
FIG. 5 is a flowchart of malware-infected mobile computing device side steps for recovering a malware-infected mobile computing device, according to some embodiments.

FIG. 5 is a flowchart of malware-infected mobile computing device side steps for recovering a malware-infected mobile computing device, according to some embodiments.

At step 502, the infected mobile computing device 103A downloads and installs the mobile device security app 120 from a third-party service. A third-party service provider (e.g. Google Play®, Apple App Store®, Microsoft Store®, etc.) receives a download and installation request submitted online by a user from another computing device, and automatically downloads and installs the mobile device security app 120 on the infected device 103A when there is an internet connection (e.g., WIFI or cellular) and when the request designates the infected device 103A for app installation.

At step 504, the infected device 103A receives a signal from the clean device 103B. The signal may include one or more instructions to direct the infected device 103A to perform certain actions. The signal may be transmitted from the clean device 103B to the infected device 103A via a read/write mode of the NFC communication.

At step 506, the infected device 103A initiates the mobile device security app 120 in response to receiving the signal transmitted from the clean device 103B. The infected device 103A may automatically scan its system to detect and/or remove the infecting malware, based on the instruction(s) included in the string of commands transmitted from the clean device 103B.

At step 508, the infected device 103A further modifies access settings of the infected device to allow the infected device to be accessible, including changing login credentials as previously discussed. Once the infected device 103A is accessible, the user associated with the infected device 103A may access the device and take further certain action, including manually removing the quarantined malware.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for gaining access to a first mobile computing device via a second mobile computing device, the method comprising the following steps:
   downloading a mobile device security application from a remote source, by the first mobile computing device, wherein the first mobile computing device is infected with malware that is preventing user access of the first mobile computing device, and wherein the mobile device security application is not installed on the first mobile computing device;
   installing the mobile device security application, by the first mobile computing device;
   receiving a signal by the first mobile computing device from the second mobile computing device, the signal comprising an instruction for running the mobile device security application installed on the first mobile computing device, wherein the second mobile computing device is not infected with the malware, and wherein the mobile device security application is installed on the second mobile computing device;
   initiating the mobile device security application on the first mobile computing device in response to receiving the signal, wherein the initiating causes the mobile device security application to run in a memory of the first mobile computing device; and
   modifying at least one access setting of the first mobile computing device, by the mobile device security application running on the first mobile computing device, wherein the at least one access setting was set by the infecting malware to block user access, and modifying the at least one access setting enables user access of the first mobile computing device.

2. The method of claim 1, wherein the signal received by the first mobile computing device is transmitted by the second mobile computing device via a non-handshake communication protocol.

3. The method of claim 2, wherein the non-handshake communication protocol comprises near field communication.

4. The method of claim 1, wherein the instruction is generated from a second instance of the mobile device security application running on the second mobile computing device, wherein a first instance of the mobile device security application is running on the first mobile computing device.

5. The method of claim 4, wherein the second instance of the mobile device security application on the second mobile computing device and the first instance of the mobile device security application on the first mobile computing device are covered under a single application license.

6. The method of claim 1, wherein the remote source further comprises a third-party app store.

7. The method of claim 1, further comprising:
   automatically detecting, by the mobile device security application running on the first mobile computing device, the malware infecting the first mobile computing device.

8. The method of claim 1, further comprising:
   automatically unloading, from a memory of the first mobile computing device, the malware infecting the first mobile computing device, by the mobile device security application running on the first mobile computing device.

9. The method of claim 1, further comprising:
   automatically changing, by the mobile device security application running on the first mobile computing device, an access authentication profile of the first mobile computing device configured by the malware infecting the first mobile computing device.

10. The method of claim 1, further comprising:
    automatically changing, by the mobile device security application running on the first mobile computing device, an access authentication mode of the first mobile computing device configured by the malware infecting the first mobile computing device.

11. The method of claim 1, further comprising:
    automatically enabling, by the mobile device security application running on the first mobile computing device, the first mobile computing device to boot into a safe mode when the first mobile computing device is restarted.

12. The method of claim 1, further comprising:
    automatically uninstalling, by the mobile device security application running on the first mobile computing device, the malware infecting the first mobile computing device.

13. The method of claim 1, further comprising:
    receiving an input from a user associated with the first mobile computing device to manually uninstall the malware infecting the first mobile computing device after the first mobile computing device is restarted.

14. A computer-implemented method gaining access to a first mobile computing device via a second mobile computing device, the method comprising the following steps:
    sending a signal, by the second mobile computing device, to the first mobile computing device, the signal comprising an instruction for running a mobile device security application installed on the first mobile computing device, wherein the first mobile device is infected with malware that is preventing user access of the first mobile computing device, and wherein the mobile device security application is not installed on the first mobile computing device, and the second mobile device is not infected with the malware and the mobile device security application is installed on the second mobile computing device.

15. The method of claim 14, further comprising:
    prior to sending the signal to the first mobile computing device, sending, by the second mobile computing device via a remote source, a download and installation instruction to the first mobile computing device to download and install the mobile device security application on the first mobile computing device.

16. The method of claim 14, wherein the signal sent by the second mobile computing device to the first mobile computing device is transmitted via a non-handshake communication protocol.

17. The method of claim 16, wherein the non-handshake communication protocol comprises near field communication.

18. The method of claim 15, wherein the instruction is generated from a second instance of the mobile device security application running on the second mobile computing device, wherein a first instance of the mobile device security application is running on the first mobile computing device.

19. The method of claim 18, wherein the second instance of the mobile device security application on the second mobile computing device and the first instance of the mobile device security application on the first mobile computing device are covered under a single application license.

20. At least one non-transitory computer readable storage medium for gaining access to a first mobile computing device via a second mobile computing device, the at least one non-transitory computer readable storage medium storing computer executable instructions that, when loaded into computer memory and executed by at least one processor of a computing device, cause the computing device to perform the following steps:

- downloading a mobile device security application from a remote source, by the first mobile computing device, wherein the first mobile computing device is infected with malware that is preventing user access of the first mobile computing device, and wherein the mobile device security application is not installed on the first mobile computing device
- installing the mobile device security application, by the first mobile computing device;
- receiving a signal by the first mobile computing device from the second mobile computing device, the signal comprising an instruction for running the mobile device security application installed on the first mobile computing device, wherein the second mobile computing device is not infected with the malware, and wherein the mobile device security application is installed on the second mobile computing device;
- initiating the mobile device security application on the first mobile computing device in response to receiving the signal, wherein the initiating causes the mobile device security application to run in a memory of the first mobile computing device; and
- modifying at least one access setting of the first mobile computing device, by the mobile device security application running on the first mobile computing device, wherein the at least one access setting was set by the infecting malware to block user access, and modifying the at least one access setting enables user access of the first mobile computing device.

21. At least one non-transitory computer readable storage medium for gaining access to a first mobile computing device via a second mobile computing device, the at least one non-transitory computer readable storage medium storing computer executable instructions that, when loaded into computer memory and executed by at least one processor of a computing device, cause the computing device to perform the following steps:

- sending a signal, by the second mobile computing device, to the first mobile computing device, the signal comprising an instruction for running a mobile device security application installed on the first mobile computing device, wherein the first mobile device is infected with malware that is preventing user access of the first mobile computing device, and wherein the mobile device security application is not installed on the first mobile computing device, and the second mobile device is not infected with the malware and the mobile device security application is installed on the second mobile computing device.

* * * * *